US006916168B2

(12) United States Patent
Romanski et al.

(10) Patent No.: US 6,916,168 B2
(45) Date of Patent: *Jul. 12, 2005

(54) COOLING TUBE FOR COOLING A PORTION OF AN INJECTION MOLDED ARTICLE

(75) Inventors: Zbigniew Romanski, Mississauga (CA); Tomasz Uracz, Everett (CA); Richard Matthias Unterlander, Nobleton (CA); Witold Neter, Newnan, GA (US); Joachim Johannes Niewels, Thornton (CA)

(73) Assignee: Husky Injection Molding Systems Ltd., Bolton (CA)

(*) Notice: Subject to any disclaimer, the term of this patent is extended or adjusted under 35 U.S.C. 154(b) by 192 days.

This patent is subject to a terminal disclaimer.

(21) Appl. No.: 10/321,940

(22) Filed: Dec. 17, 2002

(65) Prior Publication Data

US 2004/0058030 A1 Mar. 25, 2004

Related U.S. Application Data

(63) Continuation-in-part of application No. 10/246,916, filed on Sep. 19, 2002, now Pat. No. 6,737,004.

(51) Int. Cl.[7] .............................................. B29C 45/72
(52) U.S. Cl. ....................... 425/547; 264/334; 425/444; 425/556
(58) Field of Search ................................ 425/556, 547, 425/444, 526; 264/334

(56) References Cited

U.S. PATENT DOCUMENTS

| | | | |
|---|---|---|---|
| 4,047,873 A | 9/1977 | Farrell | |
| 4,102,626 A | 7/1978 | Scharrenbroich | |
| 4,208,177 A | 6/1980 | Allen | |
| 4,304,542 A | 12/1981 | Sauer | |
| 4,729,732 A | 3/1988 | Schad et al. | |
| 5,447,426 A | * 9/1995 | Gessner et al. | ............. 425/534 |
| 5,702,734 A | 12/1997 | Hartman et al. | |
| 5,837,299 A | 11/1998 | Bright et al. | |
| 5,870,921 A | 2/1999 | Piccinin et al. | |
| 6,737,007 B2 | * 5/2004 | Neter et al. | ................. 425/556 |

FOREIGN PATENT DOCUMENTS

| | | |
|---|---|---|
| EP | 0 266 804 A2 | 5/1988 |
| EP | 0 700 770 A2 | 3/1996 |
| EP | 0 283 644 B2 | 10/1996 |
| WO | WO 97/39874 | 10/1997 |

OTHER PUBLICATIONS

Mikel Knights, Porous Molds' Big Draw, Plastics Technology Online, Mar. 2001, published on Internet at Plastic-stechnology.com.

Scott W. Hopkins, Porous Aluminum Mold Materials: The New Thermoform Tooling Advantage, article from International Mold Steel, Inc., published on Internet at imsteel.com.

* cited by examiner

Primary Examiner—Tim Heitbrink (57) ABSTRACT

An injection-molded plastic part cooling tube has an extruded cylindrically shaped tube with an inside surface and an outside surface. An extruded cooling channel is disposed inside the cylindrically shaped tube, between the inside surface and the outside surface. A method for forming an injection-molded-plastic-part cooling tube includes the step of extruding a hollow aluminum tube having an inside surface, an outside surface, and at least one cooling channel in the hollow aluminum tube between the inside surface and the outside surface. Alternative cooling tubes include a tubular porous insert for vacuum forming molded articles.

20 Claims, 5 Drawing Sheets

COOLING TUBE FOR COOLING A PORTION OF AN INJECTION MOLDED ARTICLE

This is a continuation-in-part application of application Ser. No. 10/246,916, filed Sep. 19, 2002, now U.S. Pat. No. 6,737,007 the contents of which are therefore incorporated herein by reference.

BACKGROUND OF INVENTION

1. Field of the Invention

The present invention relates, in general, to cooling tubes and is particularly, but not exclusively, applicable to cooling tubes used in conjunction with a plastic injection-molding machine to cool plastic parts, such as plastic parisons or preforms. More particularly, the present invention relates to a structural configuration of these cooling tubes, and also to methods of manufacturing and using such tubes, for example in the context of a manufacturing process for preforms made from polyethylenetetraphthlate (PET) or the like.

2. Summary of the Prior Art

In the injection molding art, it is known to use post mold cooling systems that operate simultaneously with the injection molding cycle. More specifically, while one injection cycle is taking place, the post mold cooling system, typically acting in a complementary fashion with a robotic part removal device, is operative on an earlier formed set of molded articles that have been removed from the mold at a point where they are still relatively hot, but sufficiently solid to allow limited handling.

Further, it is known to use fluid-cooled, cooling tubes for post-mold temperature conditioning of molded plastic parts, such as plastic parisons or preforms. Typically, such tubes are made from aluminum (or other materials having good thermal conductivity), and are formed by conventional machining methods from solid stock.

For example, each of U.S. Pat. Nos. 4,102,626 and 4,729,732 disclose a cooling tube formed with an external cooling channel machined in the outer surface of the tube body. A sleeve is then attached to the body to enclose the channel and provide an enclosed sealed path for the liquid coolant to circulate around the body.

WO 97/39874 shows a tempering mold that has circular cooling channels included in its body.

EP-A-0700770 discloses another cooling tube configuration for holding and cooling a preform that includes an elastically deformable holder with internal cooling passages, the holder operable between an open position and a holding position by exerting external force. Suggested embodiments include the internal cooling passages oriented in either a helical or longitudinal direction. No suggestion as to a method of manufacturing the holder or a specific construction (e.g. material) is given.

A problem with known cooling tubes is that they are expensive and are time-consuming to make and assemble. Further, the operational mass (i.e. including cooling water) of the cooling tube is of particular concern considering that a typical robot take-out system may include one or more sets of cooling tubes in an array, and therefore the cummulative mass supported by the robot quickly becomes a significant operating and/or design consideration (i.e. inertia or momentum considerations for the robot). Moreover, the robot typically operates to remove many tens of preforms in a single cycle (with present PET systems producing up to one hundred and forty-four preforms per injection cycle) so the energy expended by the robot and the technical specification of the robot are unfortunately relatively high. The provision and operation of a high specification robot therefore impose considerable financial cost penalties on an end user.

U.S. Pat. No. 5,870,921 discloses an extrusion die for use in producing aluminum alloy articles of extruded shapes or tube having a void with defined internal dimension.

SUMMARY OF INVENTION

According to a first aspect of the present invention, structure and/or steps are provided for an injection-molded plastic part cooling tube that is extruded to define a cylindrically-shaped tube with an inside surface, an outside surface, and at least one cooling channel.

According to a second aspect of the present invention, injection molding machine structure and/or steps are provided with a mold structure which molds a plurality of plastic parts. A plurality of extruded cooling cavities provided and configured to hold and cool the plurality of plastic parts after they are molded by the mold structure. Each cooling cavity including a plurality of cooling channels defined by the extrusion and configured to provide for a coolant flow through the plurality of cooling cavities to extract heat from the plurality of plastic parts while they are held by the plurality of cooling cavities.

According to a third aspect of the present invention, a method for extruding an injection-molded-plastic-part cooling tube includes the steps of extruding a hollow aluminum tube having an inside surface, an outside surface, and at least one cooling channel.

According to a fourth aspect of the present invention, a tube assembly includes a tubular porous insert for vacuum forming a molded article, and to improve cooling efficiency. The porous insert includes an inner surface that is contoured to substantially correspond with the final desired molding surface of the molded article. Pressure channels in the porous insert provide a conduit for establishing a region of relatively low vacuum pressure and for evacuating air through the porous structure of the porous insert, thereby drawing a deformable molded article into contact with the contoured inside surface.

In its preferred embodiment, the present invention advantageously provides an extruded cooling tube that is easily manufactured and which is of a lightweight construction that, beneficially, reduces robot specification requirements and/or improves robot cycle time. Futhermore, the cooling tube has enhanced cooling capabilities as a consequence of improved and integrally formed channeling. In addition, alternative embodiments of the present invention provide tube assemblies that are capable of vacuum forming a molded article.

BRIEF DESCRIPTION OF DRAWINGS

Exemplary embodiments of the present invention will now be described with reference to the accompanying drawings, in which.

DETAILED DESCRIPTION

The present invention will now be described with respect to embodiments in which an extruded cooling tube is used in a plastic injection molding machine, although the present invention is equally applicable to any technology in which, following part formation, cooling of that part is undertaken by a cooling tube or the like. For example, the present invention can find application in a part transfer mechanism from an injection molding machine and a blow-molding machine.

Figure 1:
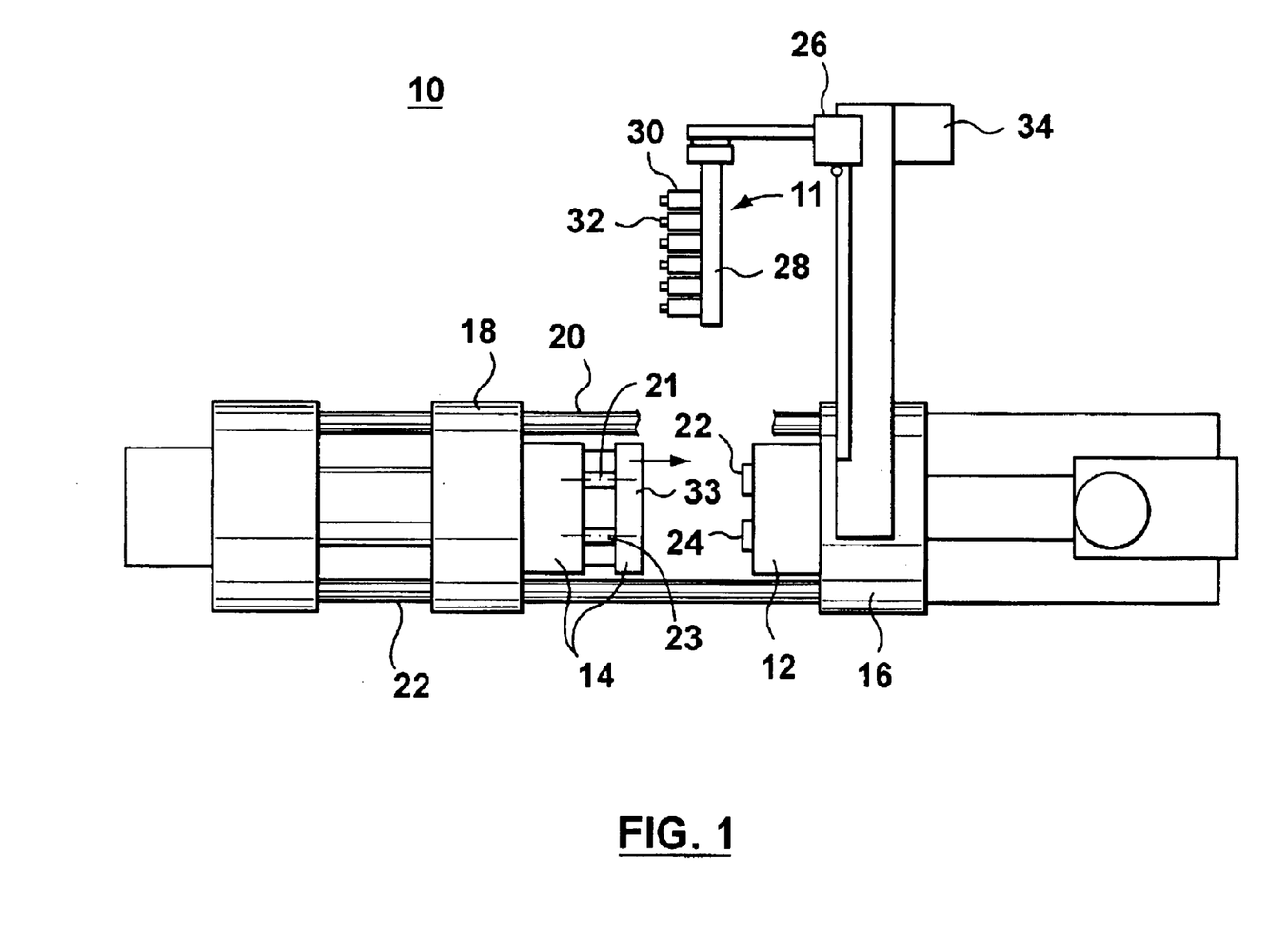
FIG. 1 is a plan view of a typical injection molding machine including a robot and an end-of-arm tool.

FIG. 1 shows a typical injection molding machine 10 capable of co-operating with a device supporting the cooling tube of the present invention. During each injection cycle, the molding machine 10 produces a number of plastic preforms (or parisons) 32 corresponding to the number of mold cavities defined by complementary mold halves 12, 14 located within the machine 10.

The injection-molding machine 10 includes, without specific limitation, molding structure such as a fixed platen 16 and a movable platen 18. In operation, the movable platen 18 is moved relative to the fixed platen 16 by means of stroke cylinders (not shown) or the like. Clamp force is developed in the machine, as will readily be appreciated, through the use of tie bars 20, 22 and a machine clamping mechanism 100 that typically generates a mold clamp force (i.e. closure tonnage). The mold halves 12, 14 together constitute a mold generally having one or more mold cavities 22, 24, with the mold halves 12, 14 each located in one of the movable platen 18 and the fixed platen 16. A robot 26 is provided, adjacent the fixed platen 16 and the movable platen 18, to carry a carrier plate assembly 11, such as a take-out plate 28 that contains a number of preform cooling tubes 30 at least corresponding in number to the number of preforms 32 produced in each injection cycle, and may be a multiple thereof.

In use, in a mold open position (as shown in FIG. 1), the robot 26 moves the carrier plate assembly 11 into alignment with, typically, a core side of the mold and then waits until molded articles (e.g. preforms 32) are stripped from respective cores 21, 23 into respectively aligned cooling tubes 30 by operation of a stripper plate 33, or the like.

Cooling tubes 30 generally include an internal surface shaped to correspond to the external profile of the molded article (e.g. preform 32), so in the context of a PET preform the cooling tubes 30 are preferably cylindrically-shaped hollow tubes with an open end through which passes a preform 32. Each cooling tube 30 further including a pressure channel at the base thereof connected to a vacuum or suction unit 34, operational to draw and/or simply hold a preform 32.

Generally, the carrier plate assembly 11 will be cooled either by connection to a suitable thermal sink and/or by a combination of techniques, including internal water channels.

Figure 2:
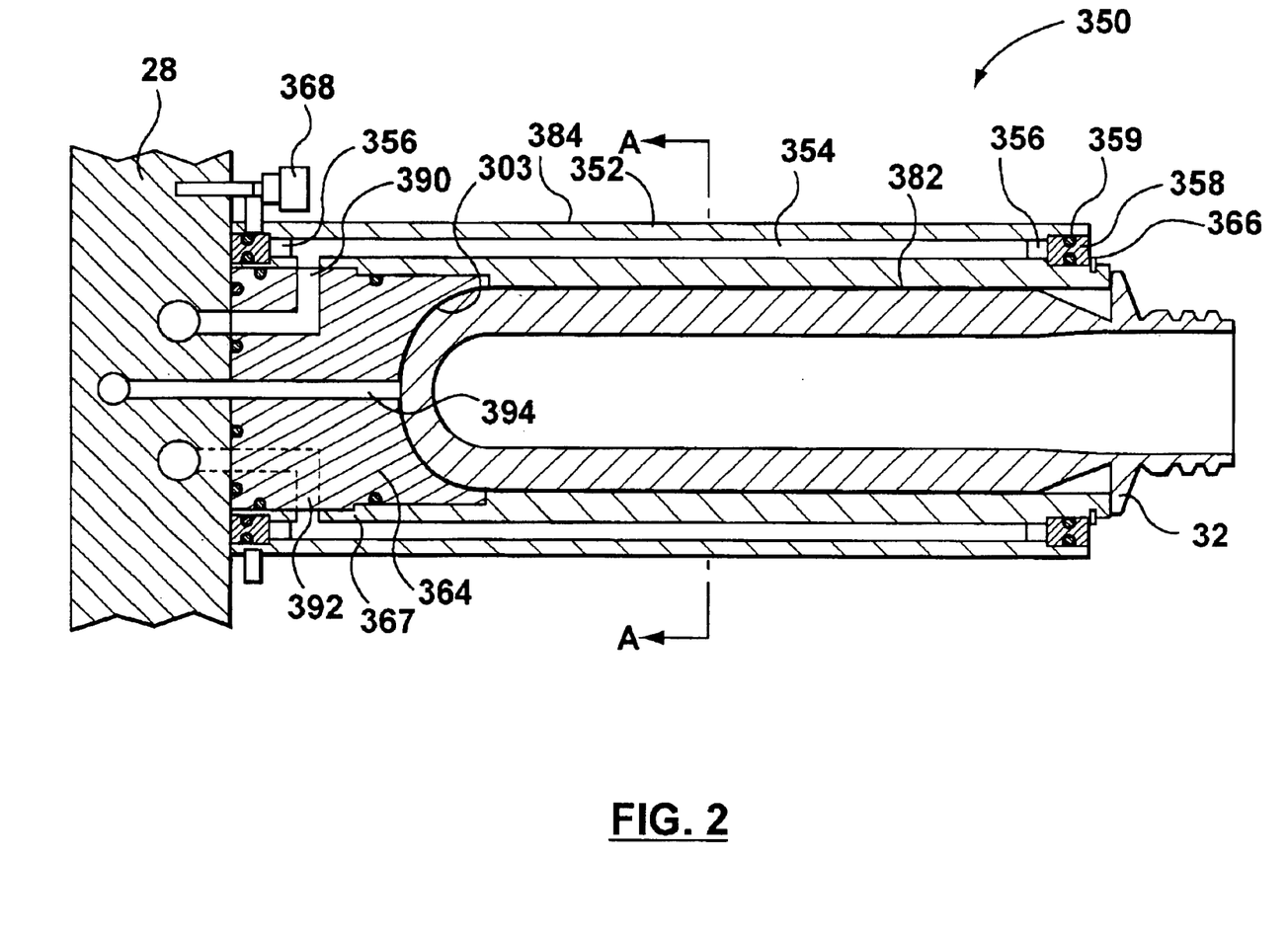
FIG. 2 is a sectional view of a cooling tube according to a preferred embodiment of the present invention.

FIG. 2 shows a sectional view through a cooling tube 350 of an embodiment of the present invention. The cooling tube 350 preferably comprises an extruded one-piece tube 352 with an outside surface 384, an inside surface 382 for operating on the preform 32. The cooling tube 350 includes a cooling circuit for cooling inside surface 382 that includes longitudinally oriented cooling channels 354 formed by extrusion between the inside surface 382 and the outside surface 384 of the tube 352. The cooling channels 354 are connected together in a desired flow configuration by any number of connecting channels 356, and the cooling circuit connected to a source and sink of coolant through inlet and outlet channels 390 and 392. The connecting channels 356 are located at the top and base of tube 352, between the outside surface 384 and the inside surface 382, and extend between two or more cooling channels 354. The connecting channels 356 are closed on one side by sealing rings 358. The sealing rings 358, including seals 359, are retained in a groove at the top and base of the cooling tube 350 by snap rings 366 or other known fastening means. The cooling tube 350 further includes a central plug 364 inserted into its base and retained by shoulder 367, the central plug 364 including a contoured inside surface 303 for supporting and otherwise operating on the bottom of a preform 32. The central plug 364 also includes a pressure channel 394, for connection to a vacuum source, for the purpose of assisting in the transfer of a preform 32 into the cooling tube 350. The coolant inlet and outlet channels 390 and 392 of the cooling circuit being provided in the central plug 364.

Figure 3:
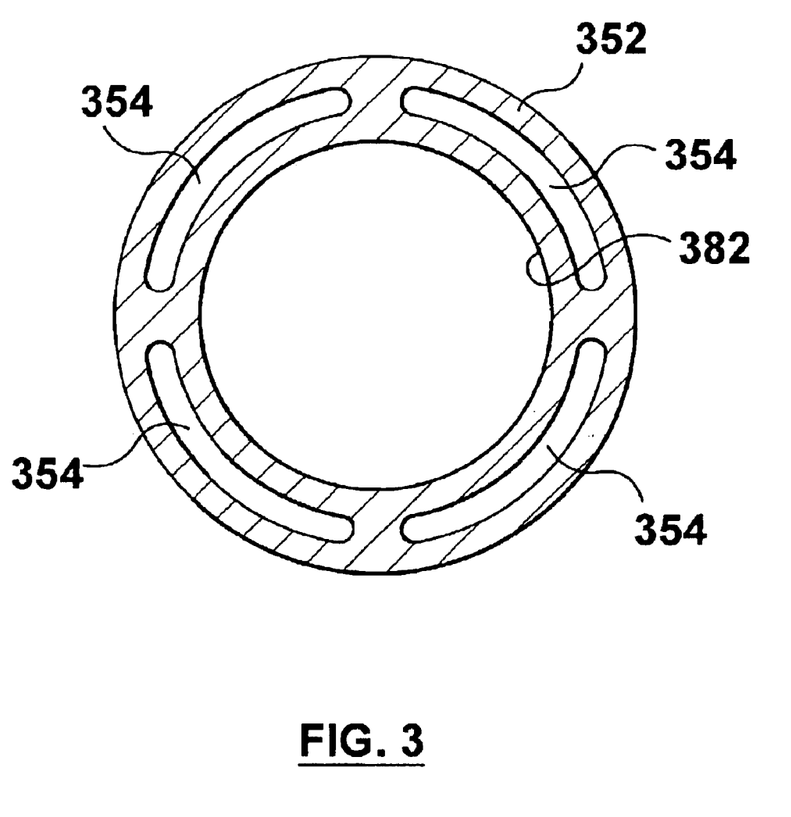
FIG. 3 is a view along section 'A—A' of FIG. 2 cooling tube.

The tube 352 preferably comprises a one-piece extruded tube with longitudinal cooling channels 354 that may have a cross sectional profile selected from a wide range of shapes. Using conventional machining techniques (e.g. milling) to machine the channels 354 with the shape shown in FIG. 3 is generally not practical beyond a length of about 4 times the diameter of the cutter being used, thereby limiting the length of cooling tube made by this method to an unsuitably small range. Therefore, an extruded tube can be identified as one having an integral cooling channel having a length generally greater than four times the minor diameter of the cooling channel 354, or one as having a substantially constant non-cylindrical cooling channel 354 shape.

The cooling channels 354 formed in the extrusion process provides channels for cooling fluid to circulate in the tube, extracting heat from the preform 32 through the tube inside surface 382. The cooling tube may include four cooling channels 354 (as shown in FIG. 3). The shapes of channels 354 are preferably arcuate-shaped, elongated slots that present a larger cooling surface area than drilled holes. Preferably, the cumulative angular extent of all elongated slots is greater than 180 degrees, the angular extent of each elongated slot being the measure of the contained, angle of an arc concentric with the cooling tube with its terminus points defining a maximum arc length through the elongated slot. Such a shape works to optimize thermal transfer from a preform 32 due to the coolant distribution that extends around a substantial portion of, and in proximity to, the inside surface 382 that contacts the preform 32, and also due from the high volume flow rate of coolant supported by the large cross sectional profile of the coolant channel 53. Further, the preferred coolant channel 354 cross-sectional profile provides for a relatively lightweight cooling tube 350, that results in an overall mass reduction in the carrier plate assembly 11 that may be considerable given that some carrier plate assemblies include upwards of 432 tubes (i.e. a carrier plate assembly with 3 sets of 144 cooling tubes), thereby allowing a lighter duty and hence lower cost robot to be used and/or allowing the plate to move faster thereby saving some cycle time and reducing energy consumption.

In an alternative embodiment of the invention, the four arcuate shape channels shown in FIG. 3 could be changed to only two larger arcuate shapes (not shown) so that one channel represents the input and the other the output, thereby simplifying the connecting channels 356.

The central plug 364 preferably includes a contoured inside surface 303 shaped to substantially match that of the part being cooled. The central plug 364 is preferably made from aluminum, and functions to cool the gate area of the preform, to define a channel for the vacuum, and to facilitate the coupling of the cooling channels to the carrier plate 11, where necessary. Provision for the pressure channel 394 is preferably at the plug's center. In one embodiment, the central plug 364 is retained between the shoulder 367 of the cooling tube and the take-out plate 28. A tube fastener 368, such as a screw or bolt, is provided to couple the cooling tube 350 to the take-out plate 28. Alternate means of assembling the plug 14 and fastening the cooling tube 350 to the take-out plate 28 may be used.

Exemplary physical dimensions of a cooling tube 350 for an arbitrary preform 32 according to the present invention suggest a representative length of about 100 mm long, an interior diameter of about 25 mm, and outer diameter of about 41 mm. For such an arbitrary cooling tube, the cooling channels 354 are preferably about 1–4 mm in thickness, about 80 mm in circumference, and about 100 mm (preferably the same length as tube) in axial length. Of course, tubes of different diameters and lengths would be made to suit the geometry of any preform 32, and hence wide variations in the coolant channel 354 dimensions are possible. The cooling tube 350 is preferably made from aluminum.

According to the present invention, an extruding process is used to form a tube 352 including the cooling channels and a hole, the hole preferably sized to be smaller than any of the plastic parts destined for cooling in the tube. The extrusion process is consistent with known techniques. The tube 352 is then cut to length and the molding surface and any other desired features (such as connecting channels 356, sealing ring 358 grooves, and any coolant inlet/outlet or pressure channels, coupling structure, etc.) are then machined. The central plug 364 is then machined, including adding desired features (such as coolant 390, 392 and pressure channel 394). The central plug 364 with all necessary seals is then installed into the cooling tube 350, and the sealing rings 358 with seals 359 installed into the sealing ring grooves in the top and bottom of the cooling tube 350, so that the entire assembly is ready for installation onto the take-out plate 28.

In a preferred embodiment, the connecting channels 356 at the top end of the tube 352 may be provided by machining through alternate separation walls (not shown) of the cooling channel 354. At the take-out plate 28 (bottom) end of the tube 352, similar alternate separation walls (not shown) are machined to connect the cooling channels 354 and provide connections to the cooling fluid inlet channel 390 and the cooling fluid outlet channel 392. Alternately, the cooling channels 354 in the tube wall could be connected directly to the corresponding ports in the take-out plate 28.

In an alternative embodiment of the present invention (not shown) the cooling tube is extruded to define a cylindrically-shaped tube with an inside surface, an outside surface, and at least one cooling channel 354 formed on the outer surface of the tube 352. A tubular sleeve fits-around the tube 352 thereby enclosing the cooling channels 354. Seals are provided between the tube 352 and sleeve to provide a water-tight connection. The cooling channels may be connected as previously described in the preferred embodiment of the invention.

In an alternative embodiment of the present invention (not shown) the cooling tube is extruded to define a cylindrically-shaped tube with an inside surface, an outside surface, and at least one cooling channel 354 formed on the outer surface of a tubular sleeve that fits-around the tube 352 thereby enclosing the cooling channels 354. Seals are provided between the tube 352 and sleeve to provide a water-tight connection. The cooling channels may be connected as previously described in the preferred embodiment of the invention.

In operation, the cooling tube is used similarly to that described in U.S. Pat. No. 4,729,732. It is preferred that the internal dimensions of the cooling tube are slightly smaller than the external dimensions of the preform being cooled. Thus, as the preform shrinks, its external size is reduced, and a vacuum acting through the central plug draws the part further into the cooling tube so that an intimate fit or contact of the preform's external surface is maintained with the inside surface of the cooling tube. Alternately, the internal dimensions of the cooling tube can be manufactured to be the same size or slightly larger than the external size of the preform being cooled, so as to permit a flow of air to be drawn past the part's external surfaces by the vacuum.

In more detail, after the preforms are formed in the injection molding machine, the mold opens by stroking the movable platen 18 away from the fixed platen 16, and the robot arm (carrying the carrier plate assembly 11) moves between the mold halves 12 and 14 so that the cooling tubes 50 can receive a set of preforms 32 that are ejected from cores 23. Applied suction may be used to encourage transfer of the preforms 32 from the cores 23 to the cooling tubes 350, and/or to retain the preforms therein. The carrier plate assembly 11 is then moved out from between the mold halves 12, 14, and then orientated so that the carrier plate assembly 11 is sequentially or selectively placed adjacent to a cooling station, a receiving station, or a conveyor. The preforms may then be transferred thereto.

In addition to the improved cooling performance of the cooling tube, there is a substantial benefit in reduced cost of manufacture. An extruded cooling tube according to the present invention, can benefit from a cost reduction relative to conventionally manufactured tube due to substantially reduced machining requirements.

Figure 4:
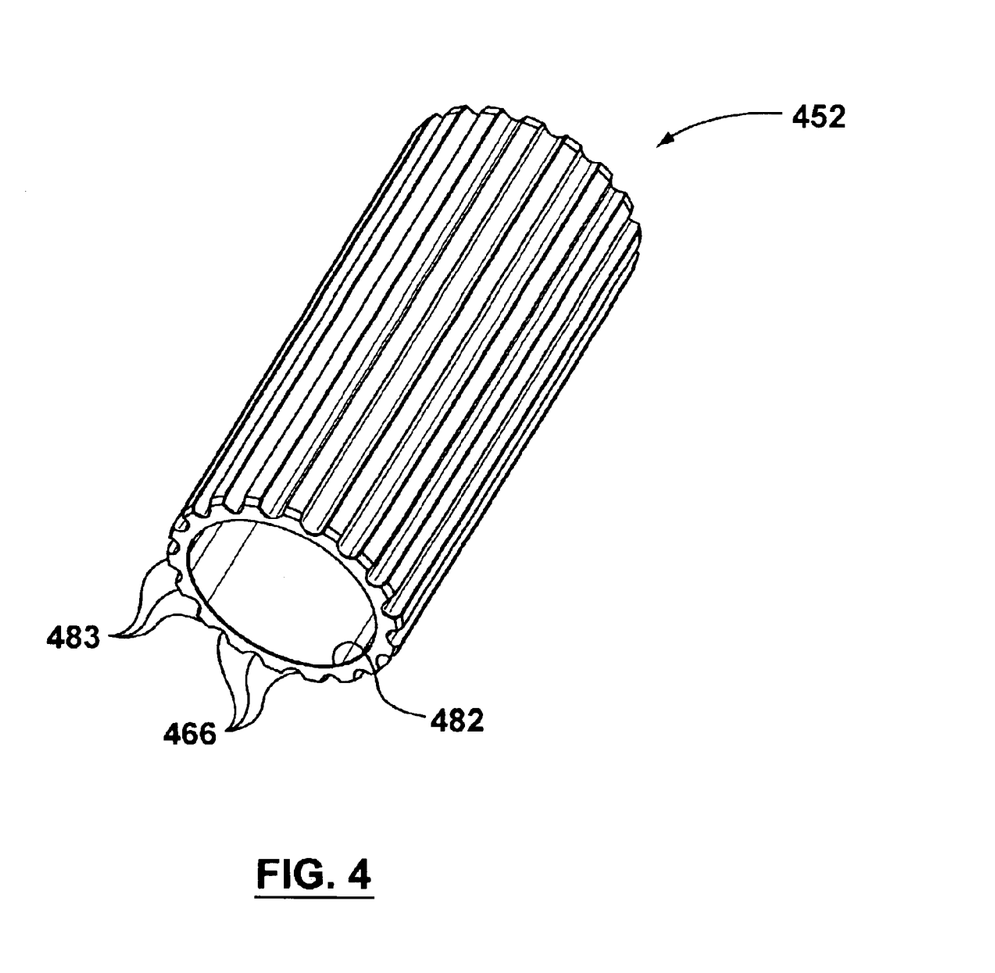
FIG. 4 is an isometric view of a cooling tube porous insert.

In an alternative embodiment of the invention (not shown) the tube assembly 350 of FIG. 2 may be modified to include a tubular porous insert 452, as shown in FIG. 4, along the inside surface 382 for vacuum forming a preform 32 and to improve preform 32 cooling efficiency due to a better heat conduction interface (i.e. larger surface area contact and more intimate fit). Reference is therefore now made to co-pending application Ser. No. 10/246,916, filed Sep. 19, 2002, and entitled "Cooling Tube With Porous Insert". The porous insert 452 includes an inner surface 482 and outer surface 483, the inner surface 482 contoured to correspond substantially with the final desired molding surface of the preform 32, the outer surface 483 may be segmented by a set of longitudinally directed pressure channels 466. The pressure channels 466 provide a conduit for establishing a region of very low vacuum pressure in proximity to the portion of the porous insert 452 between the inside surface 482 and the outside surface 483 and thereby to evacuate air through the porous structure of the porous insert 450 for the purpose of drawing a deformable preform 32 into contact with the contoured inside surface 482 of the porous insert 452, thereby vacuum forming the preform 32. The porous insert 452 is preferably made from a highly thermally conductive material, such as aluminum. The material selection for the porous insert further characterized by the requirement for a porous structure with a porosity preferably in the range of about 3–20 microns. Further, the porous insert 452 may be advantageously manufactured in a process that includes the step of extrusion.

Figure 5:
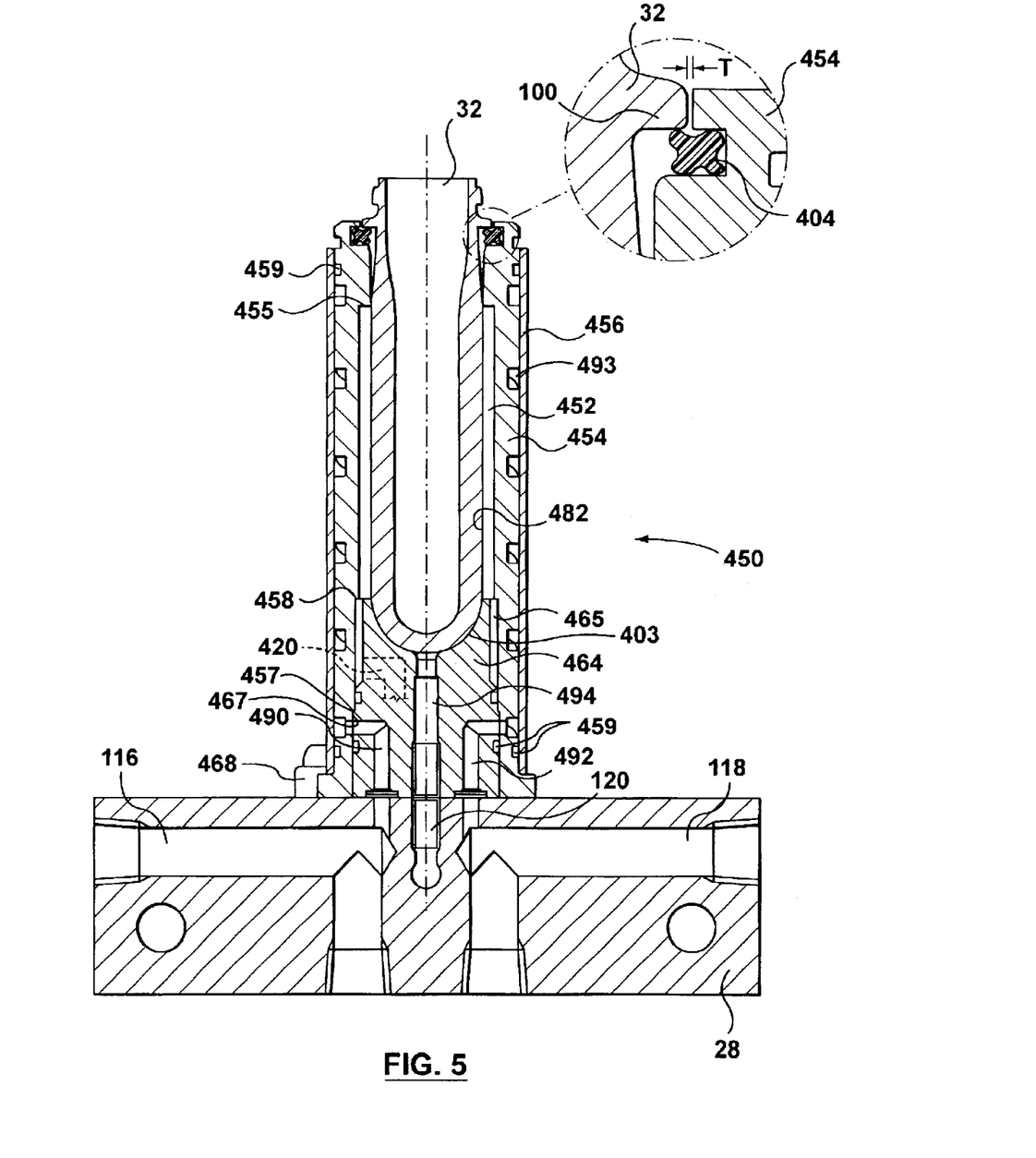
FIG. 5 is a sectional view of a cooling tube according to an alternative embodiment of the invention.

Yet another alternative embodiment of the invention is shown in FIG. 5, wherein a tube assembly 450 for vacuum forming a preform 32 is provided. The tube assembly 450 includes a tube 454 that may be machined from available tube stock, however an extruded tube such as tube 352 (as exemplified in FIG. 2) may also be used. The tube 454 includes an insert bore 455 for receiving a porous insert 452, as exemplified in FIG. 4. The porous insert 452 is retained in the tube 454 by a central plug 464, the central plug 464 received in a first and second plug bore 457, 458 of the tube 454. The central plug 464 is further retained in the tube 454 by its shoulder 467 bearing against the step between the first and second plug bore 457, 458. The shoulder 467 on the central plug 464 corresponds to a step in the diameter of the central plug 464 with a narrowed portion at its upper end that provides an annular channel 465 between the central plug 464 and the second plug bore 458 of the tube 454. The annular channel 465 connects the pressure channels 466 of porous insert 452 with a channel 420 that is formed in the central plug 464 that is in turn connected in use to a first vacuum channel in take-out plate 28. The central plug 464 includes a contoured inside surface 403 that substantially corresponds to the dome portion of preform 32 that may be used for forming and cooling the region. The central plug 464 further includes inlet and an outlet coolant channel 490, 492, and a pressure channel 494, for connection to coolant inlet and outlet channels 116, 118 and a second pressure channel in the take-out plate 28 respectively. The inlet and outlet channels 490, 492 of the central plug 464 are further connected to a cooling groove 493 formed on the outer surface of the tube 454 thereby forming a cooling circuit. The tube assembly 454 further includes a sleeve 456 that is retained on the outer surface of the tube 454. Seals 459 are also provided between the sleeve 456 and tube 454, and between the central plug 464 and the tube 454 to provide air and water tight connections between components forming the tube assembly 450. The tube 454 further includes a groove at its open and for receiving an end seal 404 that provides in use an airtight seal between the preform support ledge 100 and the tube assembly 450 for enclosing the volume formed between the preform 32 and tube assembly 450, thereby enabling the development of the required low vacuum forming pressure. The primary components of the tube assembly 450 are preferably made from a highly thermally conductive material, such as aluminum. The operation of the tube assembly 454 installed on the take-out plate 28 of the carrier plate assembly 11 will now be described. The take-out plate 28 provides cooling fluid inlet and outlet channels and first and second vacuum channels to correspond with the ports on the central plug 464. In use, a preform 32 is drawn into the tube assembly 450 by a relatively high flow rate suction acting through the pressure channel 494 that further retains the preform 32 once the preform support ledge 100 is sealed against the end seal 404 thereby stopping air flow. A high vacuum is then applied through the vacuum channel 420 in the central plug 464, then through the annular channel 465 and pressure channels 466, whereupon the vacuum acts through the porous wall of the porous insert 452. The volume of air between the preform 32 and the inner surface 482 of the porous insert 452 is at least partially evacuated to cause the drawing of the preform outer surface into contact with the porous insert 452. Once in contact with the porous insert 452, the preform 32 is cooled by conduction, its heat moving through a path from the preform outer surface to the porous insert 452, to the tube 454, and to the circulating coolant. Once enough heat has been removed from the preform 32 to ensure that it will retain its shape, the high vacuum acting through the vacuum channels 466 is released and a positive pressure is applied through the pressure channel 494 to assist in the ejection of the preform 32.

Thus, what has been described is an extruded cooling tube for a plastic part, a porous insert for use with a tube assembly for vacuum forming preforms, various advantageous embodiments of tube assemblies, methods of making the afore mentioned, and a method of using a tube assembly, which will greatly reduce the cost of such tubes in injection molding and/or improve the quality of the molded preform 32.

All U.S. and foreign patent documents discussed above are hereby incorporated by reference into the Detailed Description of the Preferred Embodiment.

While the present invention has been described with respect to what is presently considered to be the preferred embodiments, it is to be understood that the invention is not limited to the disclosed embodiments. To the contrary, the invention is intended to cover various modifications and equivalent arrangements included within the scope of the appended claims. The scope of the following claims is to be accorded the broadest interpretation so as to encompass all such modifications and equivalent structures and functions. For example, while the tube assembly of the present invention has been described in the context of a plastic injection molding machine, it will be appreciated that it is equally applicable to any technology in which, following part formation, cooling of that part is undertaken by a cooling tube or the like, e.g. in a part transfer mechanism between an injection molding machine and a blow-molding machine.

What is claimed is:

1. A cooling tube for cooling a portion of an injection molded article received therein, the cooling tube comprising:
    an annular tube body, formed by extrusion, having an inside surface, an outside surface, and a plurality of longitudinally extensive cooling channels enclosed therebetween;
    at least one connecting channel configured in the tube body to interconnect the plurality of cooling channels into at least one cooling circuit;
    a seal configured at a top and a distal end of tube body for enclosing the cooling circuit;
    a coolant inlet channel disposed in the tube body between one of the surfaces thereon and a first end of the cooling circuit;
    a coolant outlet channel disposed in the tube body between one of the surfaces thereon and a second end of the cooling circuit;
    a distal end portion of the tube body being configured to receive a plug member therein;
    a portion of the inside surface of the tube body and an end surface configured on the plug member being configured to cooperate in providing a profiled cavity that substantially conforms with an outer surface profile of the portion of the molded article.

2. The cooling tube in accordance with claim 1, wherein the plurality of cooling channels have a length which is at least four times a minor diameter thereof.

3. The cooling tube in accordance with claim 2, wherein the tube has a cross-section comprising a plurality of the cooling channels that are furthermore configured as arcuate, elongated slots.

4. The cooling tube in accordance with claim 3, wherein the cumulative angular extent of all elongated slots is greater than 180 degrees.

5. The cooling tube in accordance with claim 2, wherein the plug member includes a cooling channel inlet extension, and a cooling channel outlet extension, for connecting, in use, a source and drain of coolant with the cooling circuit inlet and outlet on the tube body.

6. The cooling tube in accordance with claim 2, wherein the plug member includes a pressure channel extending therethrough from a base of the inside surface for connecting, in use, the cavity with a controllable vacuum structure for assisting in the entry and ejection of the molded article in the cavity.

7. The cooling tube in accordance with claim 2, wherein the cavity is configured to provide an intimate fit with the outside surface of the molded article.

8. The cooling tube in accordance with claim 2, wherein the inside surface of the tube body that is configured to cooperate in providing the profiled cavity is configured along an inside surface of a porous insert that is configured for interconnection with a vacuum structure in the tube body.

9. The cooling tube in accordance with claim 1, wherein the cooling tube is configured for use on an end-of-arm tool.

10. The cooling tube in accordance with claim 9, wherein the end-of-arm tool includes:
a carrier plate for mounting, in use, to a robot in a molding system; and
at least one of the cooling tube arranged on a surface of the carrier plate.

11. The cooling tube in accordance with claim 10, wherein the number of the cooling tube assemblies corresponds with the number of molded articles produced in a cycle of the molding system.

12. The cooling tube in accordance with claim 10, wherein the number of the cooling tube assemblies corresponds with a multiple of the number of molded articles produced in a cycle of the molding system.

13. The cooling tube in accordance with any of claim 10, wherein the end-of-arm tool is configured for use in an injection molding system.

14. A cooling tube for cooling a portion of an injection molded article received therein, the cooling tube comprising:
an annular tube body, formed by extrusion, having an inside surface, an outside surface, a top surface, and a distal end surface, and a plurality of longitudinally extensive cooling channels formed through the outer surface of the tube;
a tubular sleeve, having an outside surface, and an inside surface that is configured to fit-around the tube body for enclosing the cooling channels;
at least one connecting channel configured in at least one of i) the tubular sleeve, or ii) the tube body, for interconnecting the plurality of cooling channels into at least one cooling circuit;
a seal configured at a top and a distal end of tube body for providing a water-tight connection between the tube body and the sleeve and for enclosing the cooling circuit;
a coolant inlet channel disposed in at least one of i) the tubular sleeve, or ii) the tube body between one of the surfaces thereon and a first end of the cooling circuit;
a coolant outlet channel disposed in at least one of i) the tubular sleeve, or ii) the tube body between one of the surfaces thereon and a second end of the cooling circuit;
a distal end portion of the tube body being configured to receive a plug member therein;
a portion of the inside surface of the tube body and an end surface configured on the plug member being configured to cooperate in providing a profiled cavity that substantially conforms with an outer surface profile of the portion of the molded article.

15. The cooling tube in accordance with claim 14, wherein the cavity is configured to provide an intimate fit with the outside surface of the molded article.

16. The cooling tube in accordance with claim 14, wherein the inside surface of the tube body that is configured to cooperate in providing the profiled cavity is configured along an inside surface of a porous insert that is configured for interconnection with a vacuum structure in the tube body.

17. A cooling tube for cooling a portion of an injection molded article received therein, the cooling tube comprising:
a tube body, having an inside surface, an outside surface, a top surface, and a distal end surface, and at least a portion of the inside surface of the tube body being configured to provide a profiled cavity that substantially conforms with an outer surface profile of the portion of the molded article;
a tubular sleeve, formed by extrusion, having an inside surface and an outside surface, and a plurality of longitudinally extensive cooling channels formed through the inside surface of the sleeve;
the inside surface configured to fit-around the tube body for enclosing the cooling channels therebetween;
at least one connecting channel configured in at least one of i) the tubular sleeve, or ii) the tube body, for interconnecting the plurality of cooling channels into at least one cooling circuit;
a seal configured at a top and a distal end of tube body for providing a water-tight connection between the tube body and the sleeve and for enclosing the cooling circuit;
a coolant inlet channel disposed in at least one of i) the tubular sleeve, or ii) the tube body between one of the surfaces thereon and a first end of the cooling circuit;
a coolant outlet channel disposed in at least one of i) the tubular sleeve, or ii) the tube body between one of the surfaces thereon and a second end of the cooling circuit.

18. The cooling tube in accordance with claim 17, wherein a distal end portion of the tube body is configured to receive a plug member therein, an end surface on the plug member being configured to cooperate with the portion of the inside surface of the tube body in providing the profiled cavity.

19. The cooling tube in accordance with claim 17, wherein the cavity is configured to provide an intimate fit with the outside surface of the molded article.

20. The cooling tub in accordance with claim 17, wherein the inside surface of the tube body that is configured to cooperate in providing the profiled cavity is configured along an inside surface of a porous insert that is configured for interconnection with a vacuum structure in the tube body.

* * * * *